United States Patent
Li et al.

(10) Patent No.: US 10,766,578 B2
(45) Date of Patent: Sep. 8, 2020

(54) FLOATING PLATFORM WITH 3 CANTED COLUMNS CONVERGED AT CENTER

(71) Applicants: Tingting Li, Katy, TX (US); Nan Feng, Katy, TX (US); Yumin Yang, Katy, TX (US)

(72) Inventors: Tingting Li, Katy, TX (US); Nan Feng, Katy, TX (US); Yumin Yang, Katy, TX (US)

(73) Assignee: Argus Marine Solutions, LLC, Katy, TX (US)

( * ) Notice: Subject to any disclaimer, the term of this patent is extended or adjusted under 35 U.S.C. 154(b) by 0 days.

(21) Appl. No.: 16/243,047

(22) Filed: Jan. 8, 2019

(65) Prior Publication Data

US 2020/0216148 A1    Jul. 9, 2020

(51) Int. Cl.
| | |
|---|---|
| *B63B 35/44* | (2006.01) |
| *B63B 21/50* | (2006.01) |
| *B63B 35/38* | (2006.01) |
| *F03D 13/25* | (2016.01) |

(52) U.S. Cl.
CPC ............ *B63B 35/44* (2013.01); *B63B 21/502* (2013.01); *B63B 35/38* (2013.01); *B63B 35/4413* (2013.01); *F03D 13/25* (2016.05); *B63B 2035/446* (2013.01); *F05B 2240/95* (2013.01)

(58) Field of Classification Search
CPC ..... B63B 35/00; B63B 35/44; B63B 35/4413; B63B 21/00; B63B 21/50; B63B 21/502; B63B 39/00; B63B 39/005

USPC .......................................... 114/264, 265, 267
See application file for complete search history.

(56) References Cited

U.S. PATENT DOCUMENTS

| | | | | |
|---|---|---|---|---|
| 3,556,033 | A * | 1/1971 | Bonnafous | B63B 35/4413 114/265 |
| 4,043,138 | A * | 8/1977 | Stageboe | E02B 17/025 405/205 |
| 4,443,131 | A * | 4/1984 | Olsen | E02B 17/02 405/195.1 |
| 4,829,928 | A * | 5/1989 | Bergman | B63B 21/502 114/265 |
| 8,087,849 | B2 * | 1/2012 | Leverette | B63B 21/502 114/264 |
| 8,196,539 | B2 * | 6/2012 | Leverette | B63B 21/502 114/265 |
| 8,418,640 | B2 * | 4/2013 | Leverette | B63B 35/4413 114/264 |
| 9,352,808 | B2 * | 5/2016 | Large | B63B 35/44 |

* cited by examiner

*Primary Examiner* — Lars A Olson

(57) ABSTRACT

We have invented a floating platform with 3 canted columns, a new type of fairlead, and a new method of mooring line makeup and installation method, that can be used for canted columns. The platform includes 3 columns having upper ends projecting above water surface. The columns are canted or inclined inward from the corner of hull toward the central vertical axis. The 3 columns converge at the top of column such that each column will lean against the other 2 columns. Each column has two connection points to the other 2 columns. Horizontally disposed pontoons interconnect adjacent columns at the lower ends. The columns and pontoons form a closed structure hull to support a foundation structure directly above the top of column.

12 Claims, 12 Drawing Sheets

Isometric view of a platform without topsides and mooring device

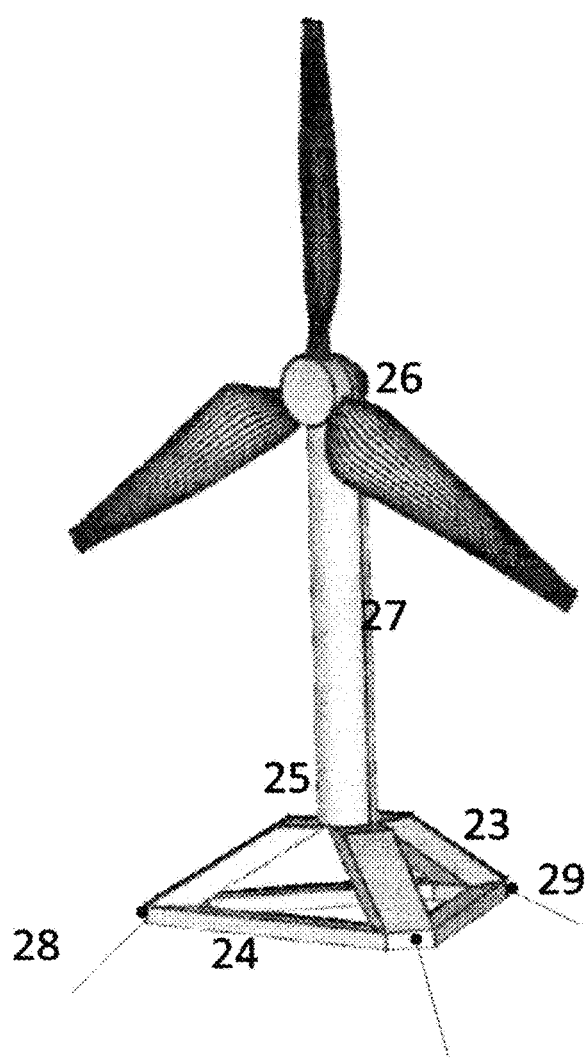
Figure 1 Isometric view of a floating wind turbine platform

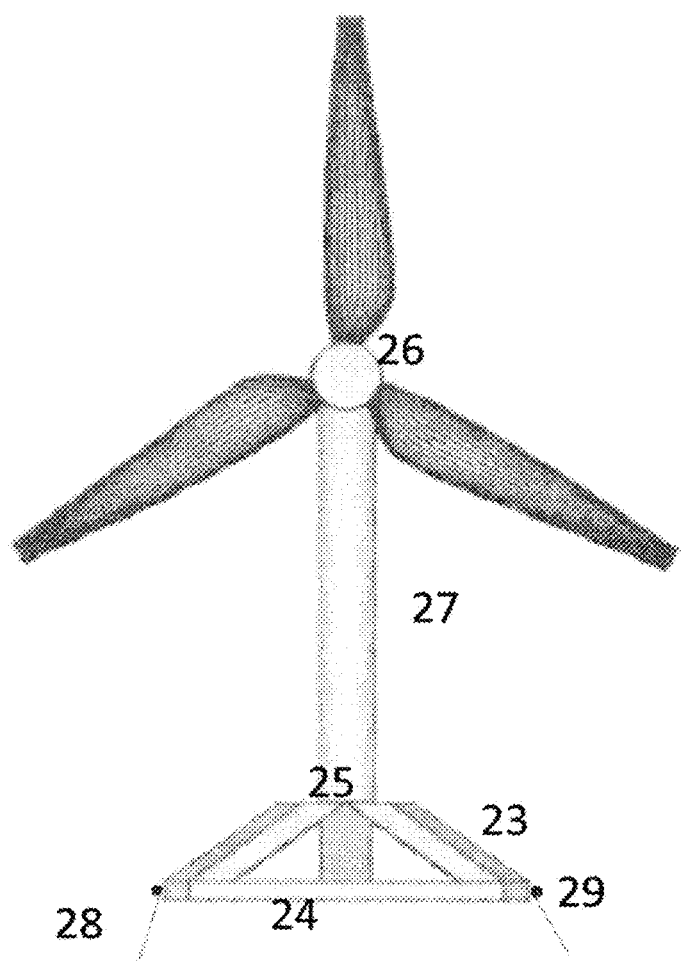
Figure 2 Elevation view of a floating wind turbine platform

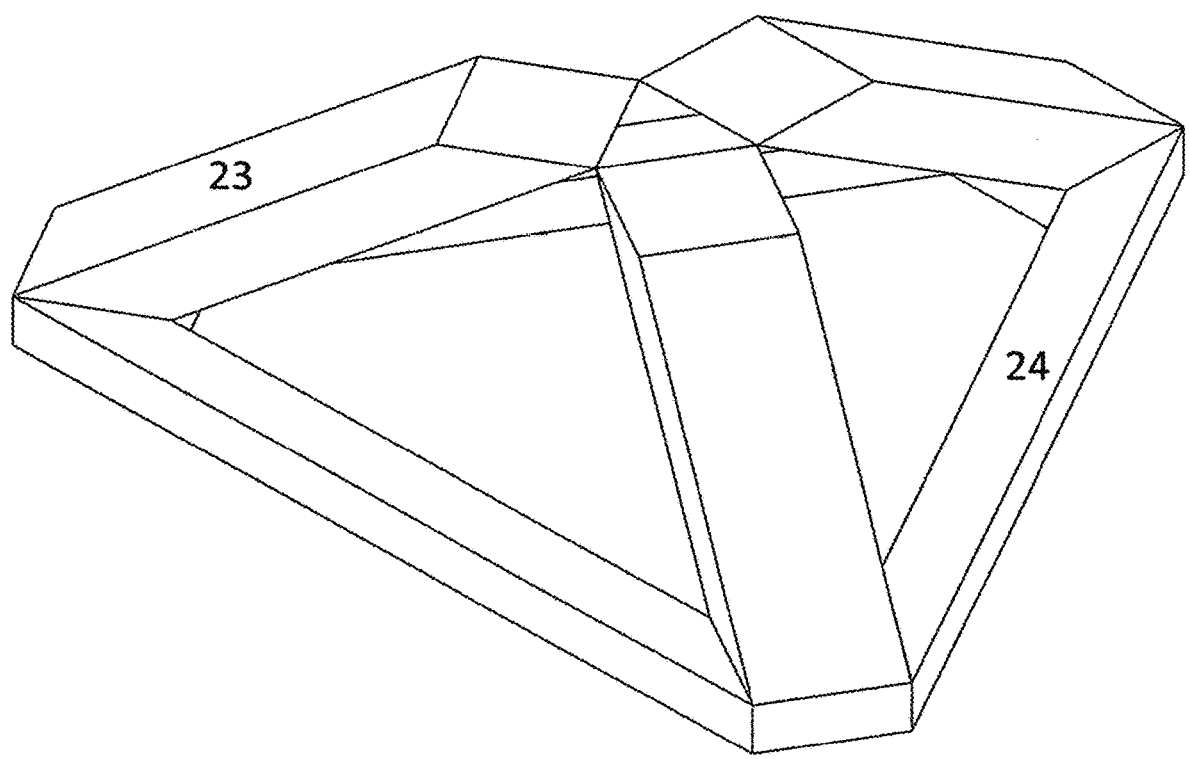
Figure 3 Isometric view of a platform without topsides and mooring device

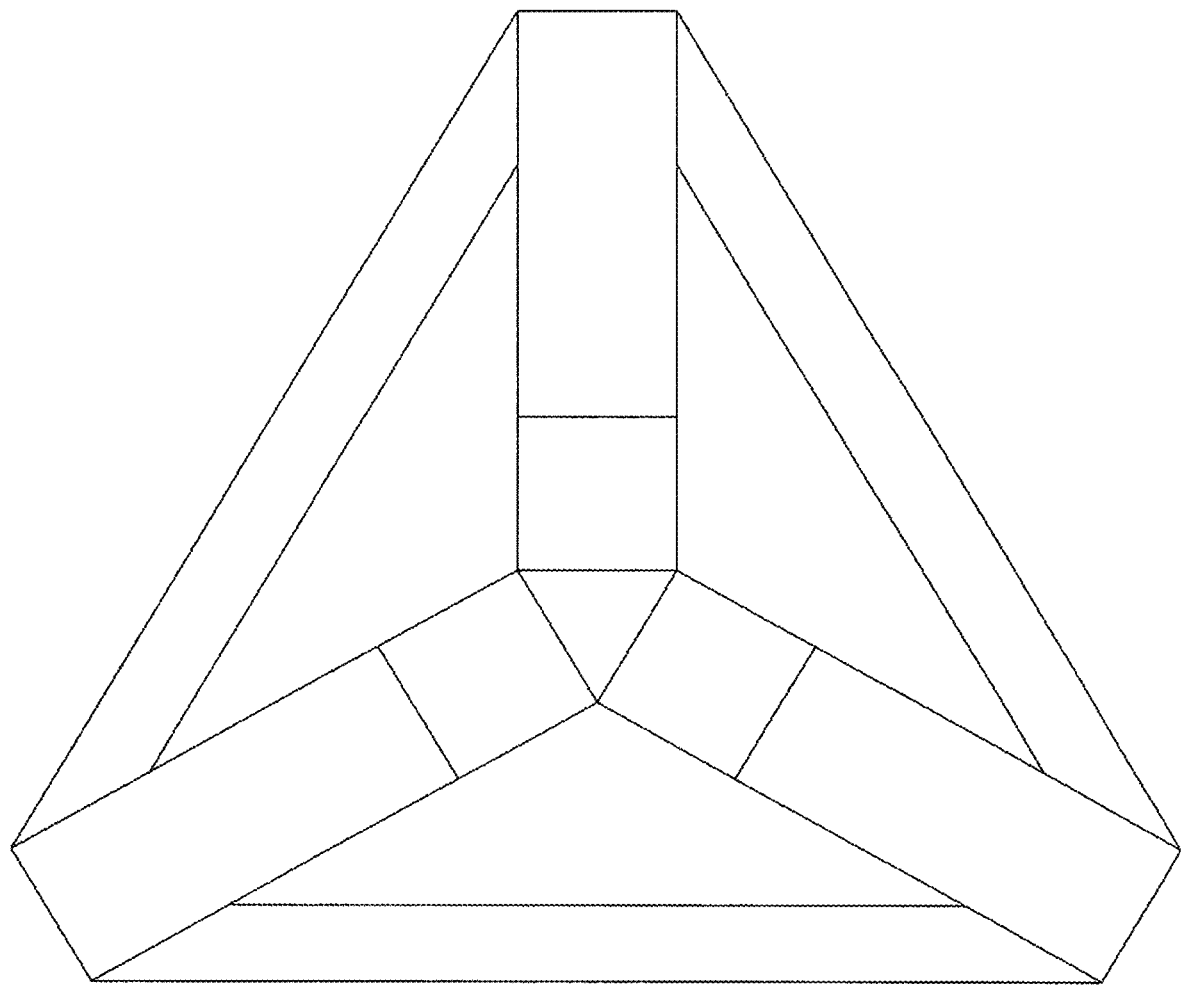
Figure 4 Plan view of a platform without topsides and mooring device

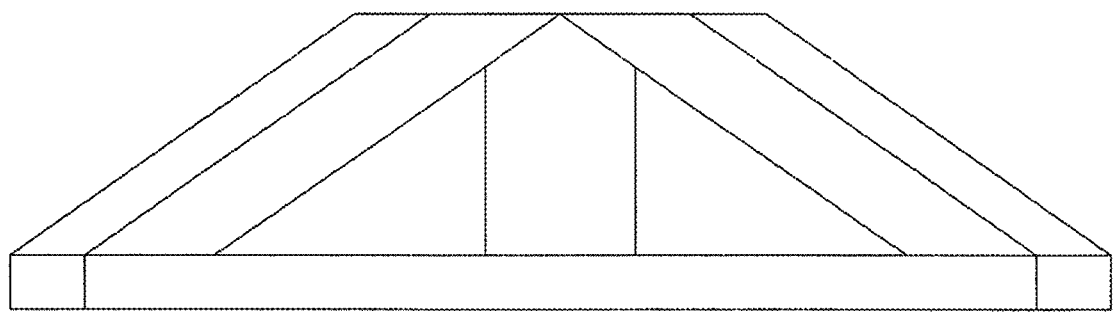
Figure 5 Elevation view of a platform without topsides and mooring device

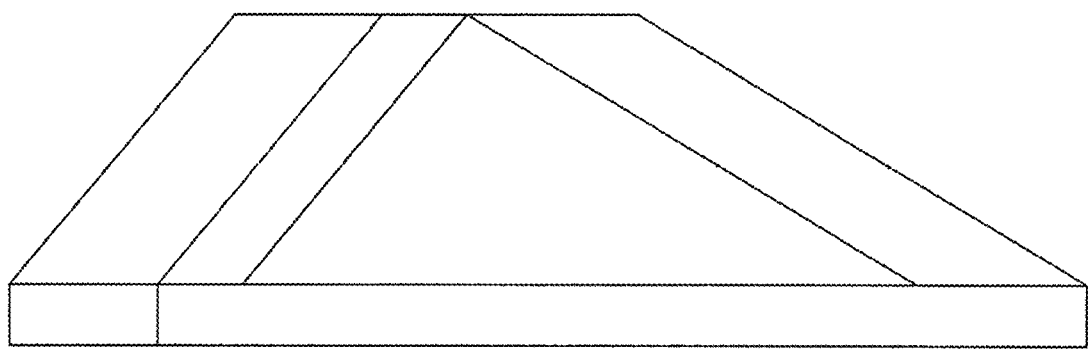
Figure 6 Elevation view of a floating platform without topsides and mooring device

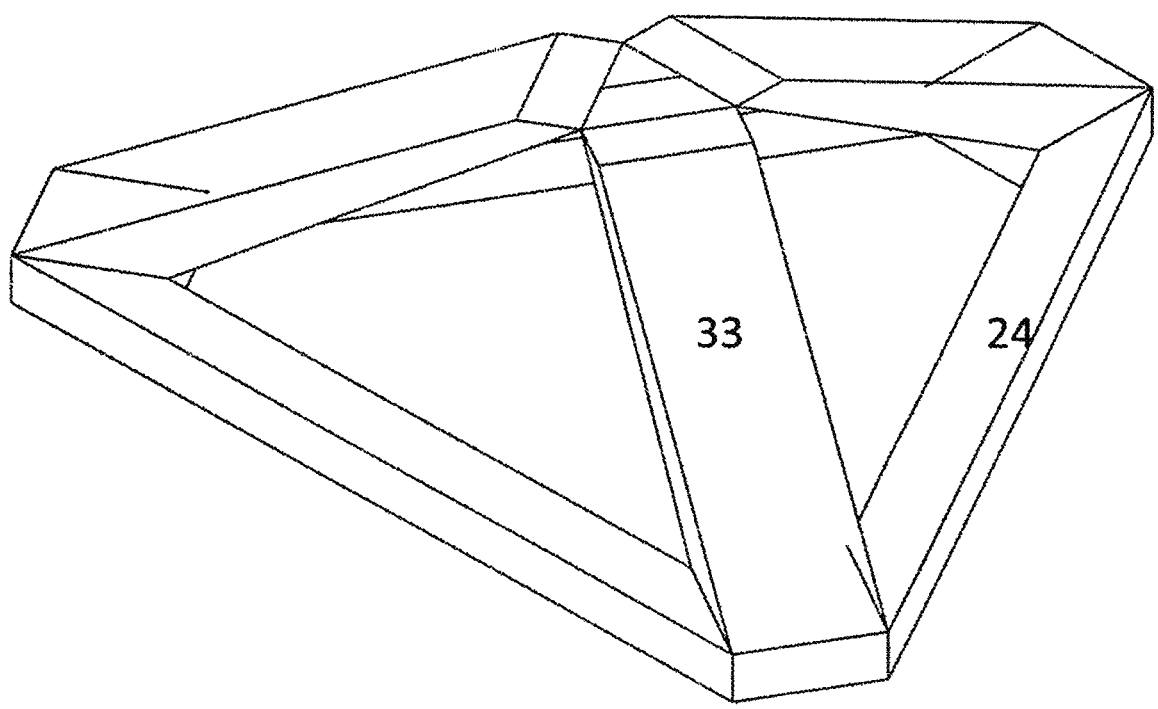
Figure 7 Isometric view of tapered column

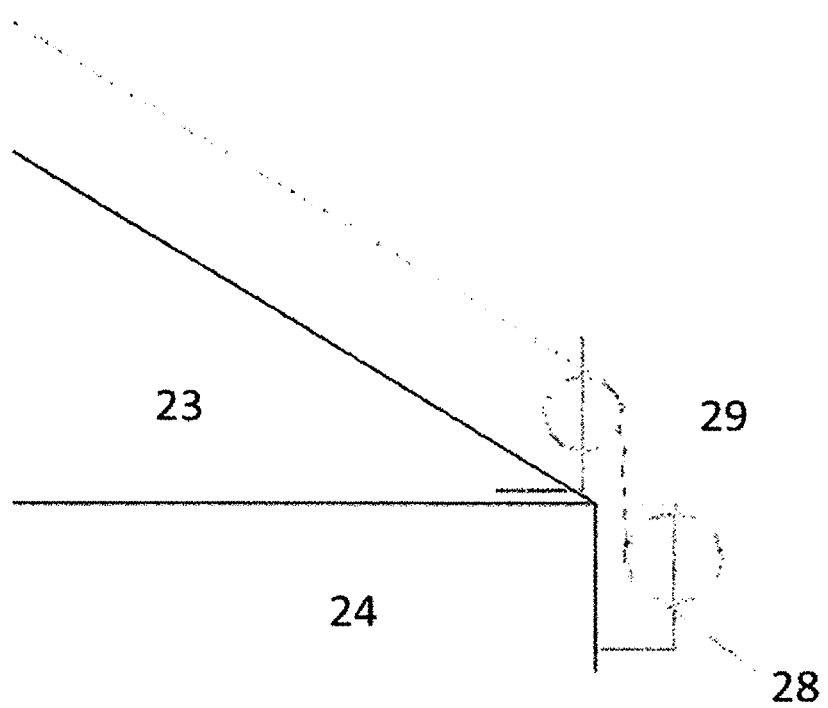
Figure 8 Double Fairlead attached to a floating platform

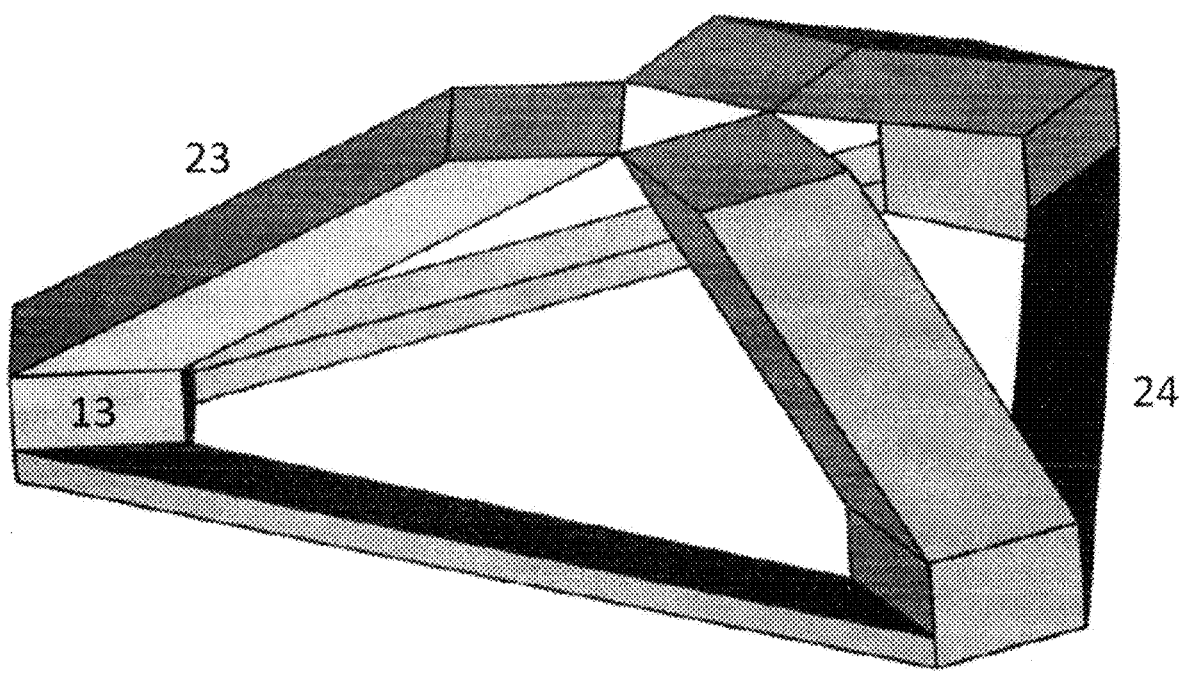
Figure 9 A floating platform: column with vertical and canted portions

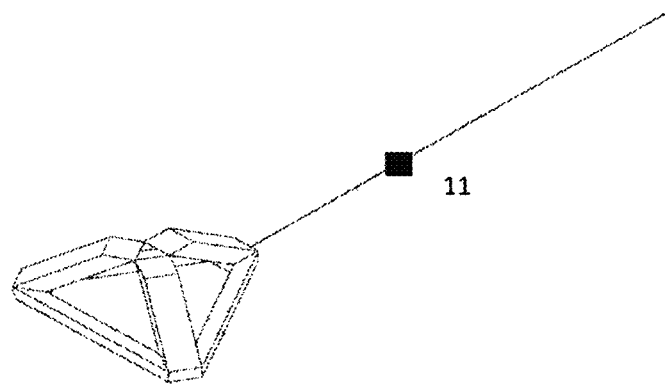
Figure 10 Installation of a floating platform: the first line

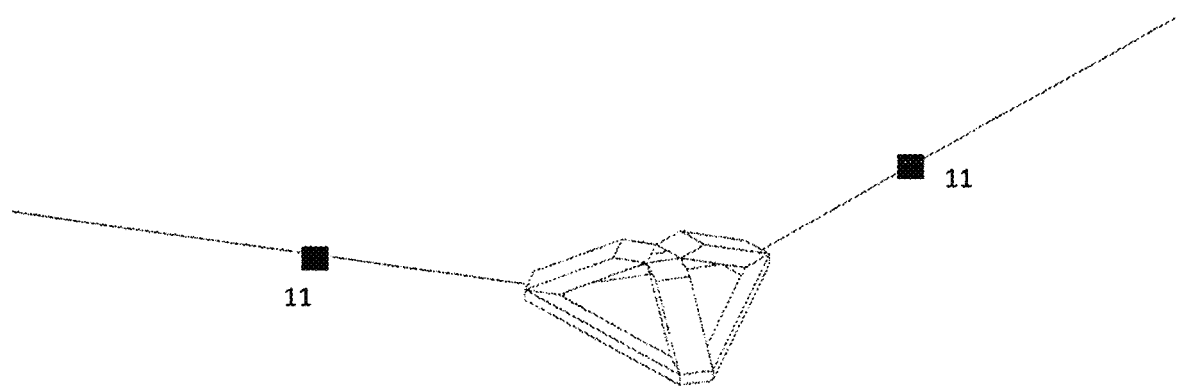
Figure 11 Installation of a floating platform: the second line

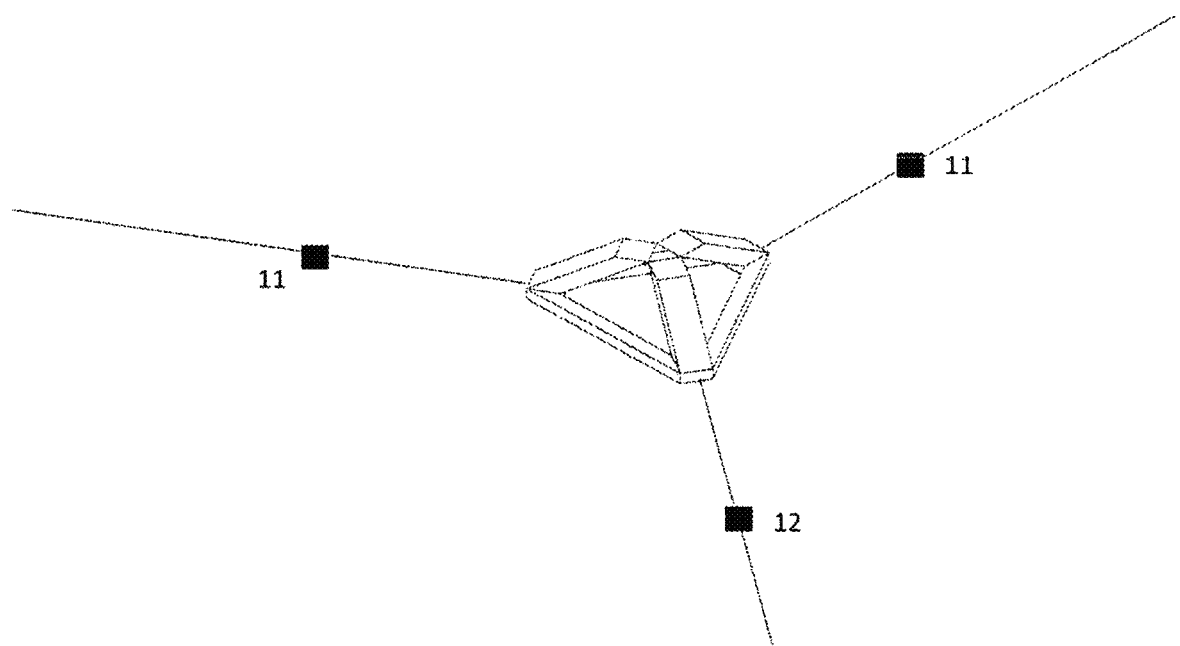
Figure 12 Installation of a floating platform: the third line

US 10,766,578 B2

FLOATING PLATFORM WITH 3 CANTED COLUMNS CONVERGED AT CENTER

The present application claims priority to the earlier filed provisional application "Floating Platform with 3 Canted Columns Converged at Center" having application No. 62/661,033, and hereby incorporates subject matter of the provisional application in its entirety.

TECHNICAL FIELD AND BACKGROUND OF THE INVENTION

There are floating platforms with small footprint topsides, such as wind turbine platforms. The platforms are with vertical columns. The vertical columns provide stability of the platforms. U.S. Pat. No. 8,196,539 Battered Column Offshore Platform shows a semisubmersible with battered columns. One embodiment of the invention is a semisubmersible with 3 columns. It is connected at column bottom by pontoons and decks on the column top. In the invention, the battered columns and pontoons form an open hull to support the deck. The columns do not converge to a central location to connect with each other. This open hull can provide support to a deck with large surface area. Large area in a deck is important for offshore oil and gas production or drilling units, since large quantity of equipment and facilities for these topsides require a large surface area in a deck. However, for a wind turbine platform or a platform with small footprint topsides, this requirement is no longer valid.

SUMMARY OF THE INVENTION

A new concept according to Claim 1-10 provides a new platform shape. The concept is different from prior arts such as a battered column semisubmersible for oil and gas platform. The advantage of using canted columns converging to a central location over prior art is that it eliminates the deck structure, which was critical to offshore oil and gas facilities, by using the columns to directly support topsides or turbines and its foundation. The overall structure weight and VCG are reduced so that the platform is hydrostatically stable with topsides or wind turbines installed at quayside. This eliminates the need of offshore integration of wind turbine with hull at work site.

Traditional platform has very small inclination or no inclination in the column structure. The mooring lines have to departure at a certain angle to avoid mooring line interfering with the hull structure. For the canted column structures, due to inclination, the column inclination and pontoon side forms an angle. The mooring line's departure angle is not necessarily the same as column inclination angle. Therefore traditional fairlead will not function. The invented new fairlead will provide one additional wheel to allow lines to make one more turn before departure similar to traditional mooring lines. This additional wheel enables the mooring lines working properly for inclined column structure.

The mooring system of the platform contains mooring lines (chain, chain/wire, or chain/rope) with fixed length on two of the 3 columns. No line tensioning device such as mooring winch or chain jacks are used on these lines. Mooring lines on the third column contains line tensioning device including but not limited to in line tensioner that can be used to adjust mooring line length to tension up the mooring lines or adjust mooring line tension for various purposes including synthetic rope creep management. There could be no fairleads, mooring winches or chain jacks.

A method to install the above mentioned platform mooring according to Claim 11:

Step 1: mooring the said platform using connection device including but not limited to mooring connectors on one column first. FIG. 10 shows mooring connector 11 is used. The length of lines is pre-determined.

Step 2: continue mooring of lines on another column with connection device including but not limited to mooring connectors. The length of lines is pre-determined.

Step 3: After lines are installed for 2 columns, tensioning device including but not limited to in-line mooring tensioners or other tensioner such as Stevtensioner are used for lines on the remaining column to tension up all of the lines. FIG. 12 shows the last mooring line installation with in line tensioner 12. The length of lines is determined by as designed line length at pretension level plus additional length for pulling force above pretension level.

Step 4: check line tensions in all lines to make sure it is to pretension requirement.

A wind platform can work fine with the above mentioned method, without chain jacks or mooring winch onboard of the platform, since the frequent changing of mooring length or change of platform position is not necessary. However, traditional oil and gas drilling or production units cannot use this method due to the fact that constant changing of mooring length may be required.

BRIEF DESCRIPTION OF THE DRAWINGS

We have included 12 drawing sheets:

FIG. 1 is an isometric view of a floating platform (a three-column hull is shown in the drawing but the hull can have three or more columns of any shape).

FIG. 2 is an elevation view of the platform.

FIG. 3 is an isometric view of the platform without topsides, wind turbine, or mooring.

FIG. 4 is a top plan view of the platform without topsides, wind turbine, or mooring.

FIG. 5 is an elevation view of the platform without topsides, wind turbine, or mooring.

FIG. 6 is another elevation view of the platform without topsides, wind turbine, or mooring.

FIG. 7 is an isometric view of a tapered column platform without topsides, wind turbine, or mooring.

FIG. 8 shows a double fairlead used for the platform.

FIG. 9 shows a floating platform column with both vertical and canted portions.

FIG. 10 shows the first mooring line is installed on a floating platform with mooring connectors.

FIG. 11 shows the second mooring line is installed on a floating platform with mooring connectors.

FIG. 12 shows the third mooring line is installed on a floating platform with special in line mooring tensioner or similar mooring connectors.

DETAILED DESCRIPTION

The components of the invention are:

A floating platform is with pontoon shape 24 and column 23. The platform can be with 3 pontoons as shown in FIG. 1 and FIG. 2, or 4 pontoons, or more pontoons that are not shown in the figures. The pontoon can be square, rectangular, or cylindrical, or other shapes. The column can be square, rectangular, or cylindrical, or other shapes. FIG. 1 shows rectangular pontoons and rectangular columns. On the top, there is foundation 25 supporting a turbine 26. The foundation 26 could be a truss type or box shape structure supporting turbine and tower 27. The foundation could be a pole supporting wind turbine, a deck structure supporting equipment, or other devices. Mooring lines 28 is shown to illustrate the station keeping. This can be catenary, taut, or even vertically tensioned up. It is attached to fairlead 29 on the hull. FIGS. 3 and 4 do not show any actual wind turbines or other devices for clarity, but the intention is to support above mentioned topsides.

One alternative of invention is a floating platform with pontoon 24 and column 23. The platform can be with 3 pontoons as shown in FIG. 1 and FIG. 2. In the said platform, FIG. 1 shows rectangular pontoons and rectangular columns. On the top, there is foundation 25 supporting a wind turbine 26. The foundation 25 could be a truss type, a box shape, or a substantially cylindrical shape structure supporting turbine 26 and tower 27. The foundation could be used to support a wind turbine, a deck structure supporting equipment, or other devices. Mooring line 28 is shown to illustrate the station keeping. This can be catenary, taut, or even vertically tensioned up. FIG. 3, FIG. 4, FIG. 5, and FIG. 6 do not show any actual wind turbines or other devices for clarity, but the intention is to support above mentioned topsides.

One alternative of floating platform is with pontoon 24 and column 23. The platform can be with 4 pontoons and 4 columns. On the top, there is foundation 25 supporting a wind turbine 26. The foundation 25 could be a truss type, a box shape, or a substantially cylindrical shape structure supporting turbine 26 and tower 27. The foundation could be used to support a wind turbine, a deck structure supporting equipment, or other devices. Mooring line 28 is shown to illustrate the station keeping. This can be catenary, taut, or even vertically tensioned up. FIGS. 3 and 4 do not show any actual wind turbines or other devices for clarity, but the intention is to support above mentioned topsides.

FIG. 3 is an isometric view of the platform without topsides, wind turbine, or mooring.

FIG. 4 is a top plan view of the platform without topsides, wind turbine, or mooring.

FIG. 5 is an elevation view of the platform without topsides, wind turbine, or mooring.

FIG. 6 is another elevation view of the platform without topsides, wind turbine, or mooring.

FIG. 7 shows an isometric view of a tapered column platform without topsides, wind turbine, or mooring. This is another embodiment of the invention, which has tapered column with large sectional area on the bottom, and small sectional area on the top of column.

FIG. 8 shows another embodiment of the invention, which has mentioned double wheel fairlead installed on the canted column to allow permanent or temporary mooring line tensioning device (winch, chain jack or other devices) on the platform. It has mooring line 28 passes the invented fairlead 29. In fairlead 29, one additional wheel is used to allow the line to make a turn. The top and bottom wheels are supported and rotate about the same axis. The axis can be vertical or inclined.

FIG. 9 shows a floating platform column with both vertical and canted portions, which is another embodiment of the invention. It has vertical column between pontoon top until a location between ½ of the draft and 3/2 of the draft. The inclined column starts from the end of vertical column and converges to the center of platform and connects with other inclined columns.

Other alternative embodiments could be:

Another embodiment of the invention is to have vertical tensioned lines as station-keeping in the center.

One installation method of the platform is to have in-line mooring tensioner for lines on one column or more columns. The mooring system of the platform contains mooring lines (chain, chain/wire, or chain/rope) with H links on 2 of the 3 columns. Mooring lines on the last column contains in line tensioner that can be used to tension up the mooring lines. There could be no fairleads, mooring winches or chain jacks.

FIG. 10 shows the first mooring line is installed on a floating platform with mooring connectors.

FIG. 11 shows the second mooring line is installed on a floating platform with mooring connectors.

FIG. 12 shows the third mooring line is installed on a floating platform with special in line mooring tensioner or similar mooring connectors.

The invention claimed is:

1. A floating platform, comprising:
   a. at least 3 columns (23), wherein each of said at least 3 columns comprises an upper end and a lower end;
   b. at least 3 pontoons (24), wherein each of said at least 3 pontoons comprises a left end and a right end;
   wherein, each of said at least 3 columns is connected to two adjacent columns of said at least 3 columns at said upper end to converge and form a surface for supporting of a topside, each of said at least 3 pontoons is horizontally disposed with said left end and right end separately connected to the lower ends of two adjacent columns of said at least 3 columns to form a closed hull structure whereby one or more of said at least 3 columns are canted or inclined inward.

2. The floating platform of claim 1, wherein one or more of said at least 3 columns or 3 pontoons have a cross section that is substantially rectangular.

3. The floating platform of claim 1, wherein one or more of said at least 3 pontoons is circular in shape.

4. The floating platform of claim 1, wherein one or more of said at least 3 columns is circular in shape.

5. The floating platform of claim 1, wherein said floating platform further comprises vertical tensioned lines.

6. The floating platform of claim 1, wherein one or more of said at least 3 columns are tapered columns (33) having a large sectional area at said lower end, and a small sectional area at said upper end.

7. The floating platform of claim 1, further comprising a double wheel fairlead (29).

8. The floating platform of claim 1, wherein one or more of said at least 3 columns comprises a vertical portion (13) and a canted portion (23).

9. The floating platform of claim 1, wherein said floating platform comprises 3 columns.

10. The floating platform of claim 1, wherein said floating platform comprises 4 columns.

11. A method of installing said floating platform of claim 1, comprising the steps of:
   a. providing a mooring system comprising mooring lines and connection devices;
   b. installing one of said connection devices on each of said at least 3 columns except for a last column;
   c. mooring all said columns installed with connection device in step (b) with said mooring lines one by one; and
   d. installing a line tensioning device on said last column and tensioning up all of said mooring lines to a desired tension.

12. The method of claim 11, wherein said floating platform comprises 3 columns.

* * * * *